(12) United States Patent
Gho et al.

(10) Patent No.: US 10,313,058 B2
(45) Date of Patent: Jun. 4, 2019

(54) FALSE POSITIVE DETECTION USING COMBINING GAIN

(71) Applicant: Intel IP Corporation, Santa Clara, CA (US)

(72) Inventors: Gwang-Hyun Gho, Cupertino, CA (US); Joan Anton Olivella, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 62 days.

(21) Appl. No.: 15/453,330

(22) Filed: Mar. 8, 2017

(65) Prior Publication Data
US 2018/0262299 A1 Sep. 13, 2018

(51) Int. Cl.
| | |
|---|---|
| *G06F 11/10* | (2006.01) |
| *H03M 13/00* | (2006.01) |
| *H04L 1/00* | (2006.01) |
| *G06F 17/18* | (2006.01) |
| *H04L 1/20* | (2006.01) |
| *H04W 84/04* | (2009.01) |

(52) U.S. Cl.
CPC ............ *H04L 1/0045* (2013.01); *G06F 17/18* (2013.01); *H04L 1/0061* (2013.01); *H04L 1/20* (2013.01); *H04W 84/042* (2013.01)

(58) Field of Classification Search
CPC ....... H04L 1/0045; H04L 1/0061; H04L 1/20; H04L 1/005; G06F 17/18; H04B 17/318; H04B 17/345; G10L 19/008; G10L 19/22; G10L 19/24; G10L 21/038
See application file for complete search history.

(56) References Cited

FOREIGN PATENT DOCUMENTS

| | | |
|---|---|---|
| EP | 2398179 A2 | 12/2011 |
| EP | 2624492 A1 | 8/2013 |
| WO | 20110137918 A1 | 11/2011 |

OTHER PUBLICATIONS

International Search Report dated Apr. 26, 2018 for International Application PCT/US2018/016816.

*Primary Examiner* — Guerrier Merant
(74) *Attorney, Agent, or Firm* — Eschweiler & Potashnik, LLC

(57) ABSTRACT

A method for detecting that a set of bits has been incorrectly decoded includes calculating a combining gain experienced during processing of the set of bits. The combining gain is compared to a threshold. A false positive signal that indicates that the set of bits has been incorrectly decoded is generated when the combining gain is less than the threshold.

23 Claims, 5 Drawing Sheets

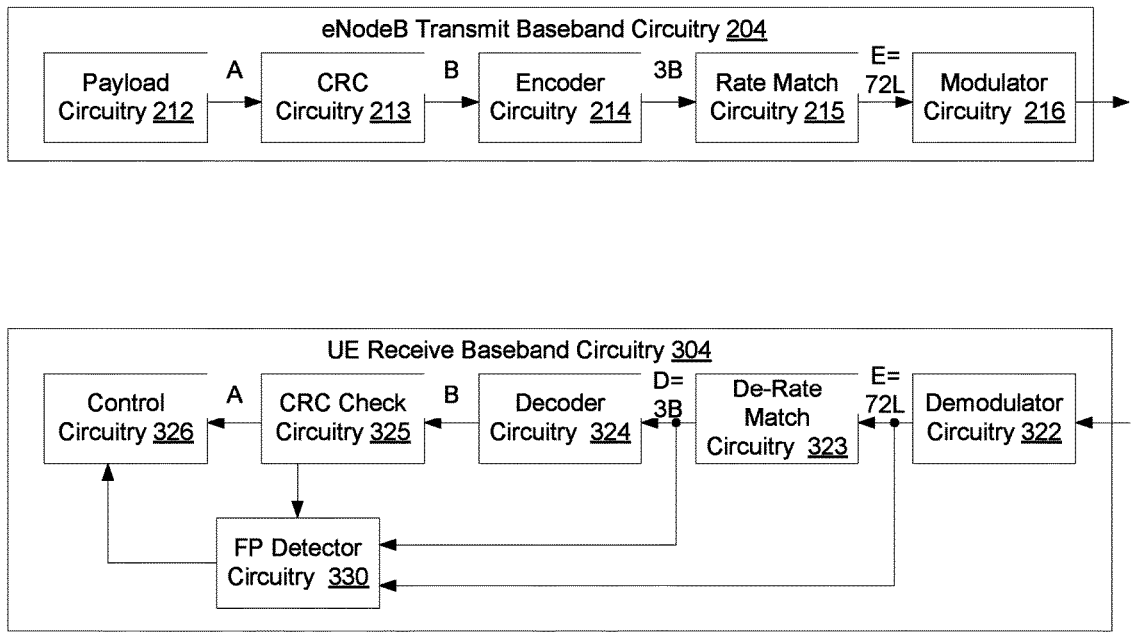
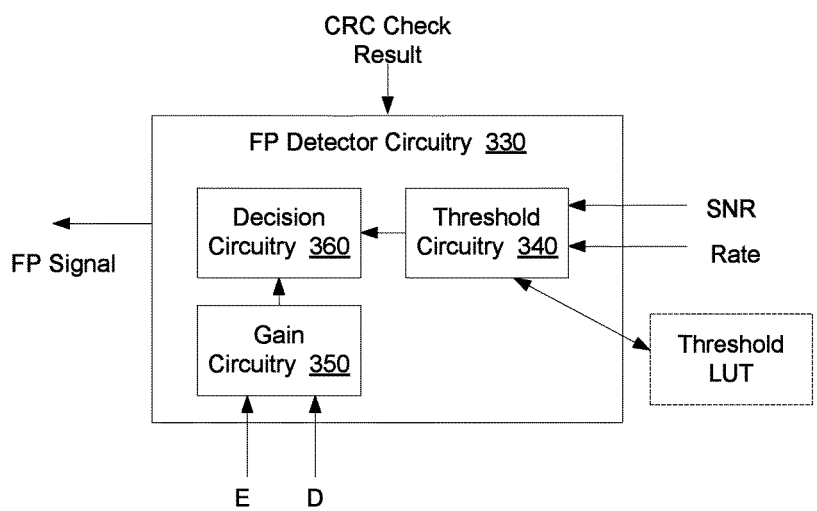
FIG. 3

FALSE POSITIVE DETECTION USING COMBINING GAIN

FIELD

The present disclosure relates to the field of wireless transmitters and in particular to methods and apparatus for improving channel decoding.

BACKGROUND

Long Term Evolution (LTE) networks may transmit control information at the beginning of each downlink transmission period. As specified by the 3$^{rd}$ Generation Partnership Project (3GPP), LTE cells may transmit with a 1 ms Transmission Time Interval (TTI), where each 1 ms TTI is a subframe and groups of 10 consecutive subframes are grouped into radio frames. The first several (e.g. between one and four) symbol periods of each subframe may then be allocated for control information, which may be transmitted on the Physical Downlink Control Channel (PDCCH). Mobile terminals connected to a given LTE cell may then need to read the PDCCH symbols at the beginning of each subframe in order to obtain essential control information, which may include uplink transmission grants, downlink scheduling messages, transmit power control messages, etc.

BRIEF DESCRIPTION OF THE DRAWINGS

Some examples of circuits, apparatuses and/or methods will be described in the following by way of example only. In this context, reference will be made to the accompanying figures.

FIG. 2 illustrates an exemplary transmit circuitry in an evolved Node B (eNB) and an exemplary receive circuitry in a user equipment (UE) device.

FIG. 3 illustrates an exemplary false positive detector circuitry.

DETAILED DESCRIPTION

Figure 1:
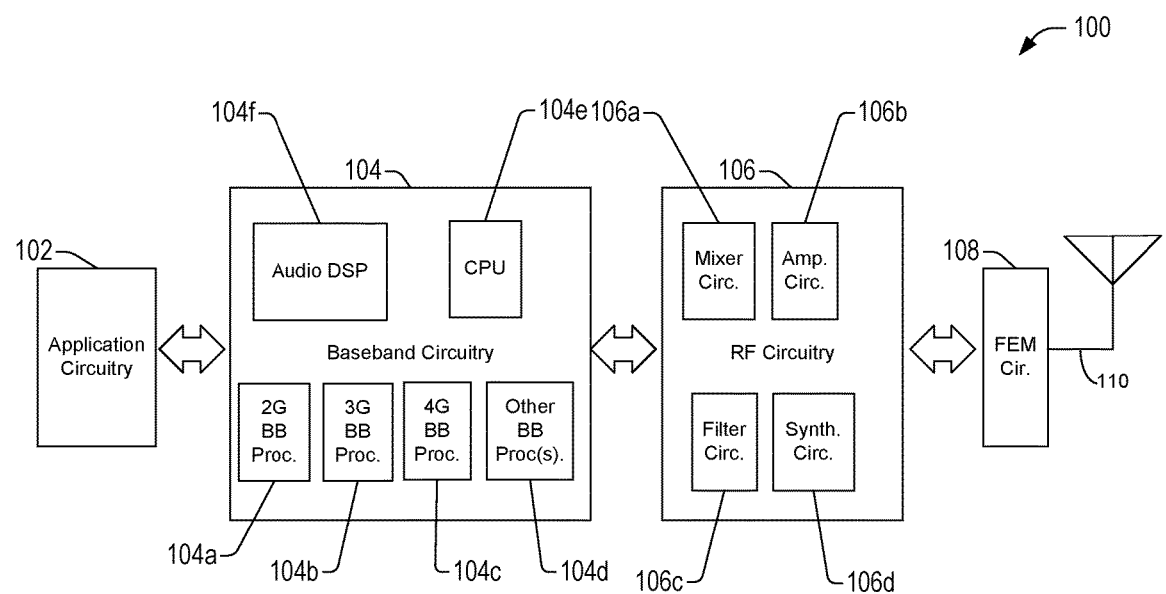
FIG. 1 illustrates an exemplary wireless user equipment (UE) device.

LTE defines several important downlink physical control channels. The physical broadcast channel (PBCH) carries Master Information Block (MIB). The physical downlink control channel (PDCCH) carries Downlink Control Information (DCI). Both the PBCH and PDCCH payloads are protected by error control codes: cyclic-redundancy check (CRC) code for error detection, followed by tail-biting convolutional code (TBCC) also for error correction. As in any CRC-protected error control systems, PBCH and PDCCH suffer from the "false positive", where information bits that were erroneously corrected by a forward error correction (FEC) decoder still passes the CRC check. Further, the physical hybrid ARQ indicator channel (PHICH) carries the hybrid-ARQ ACK/NACK for the physical uplink shared channel (PUSCH). PHICH is protected by a repetition code, followed by a spreading code. Even though CRC is not employed for PHICH, it's still vulnerable to "false positive" ACK/NACK decision.

Similar to other cellular systems, LTE physical control channels are typically protected by low-rate FEC codes including repetition codes. The code rate for PBCH is 1/12 for 1 transmission time interval (TTI), and 1/48 across 4 TTI's. The code rate for PDCCH can be as low as 1/20 for DCI format 1C. The code rate for PHICH after repetition and spread is 1/24. In low-code-rate FEC systems, encoded bits are transmitted repeatedly during what is commonly called rate-matching. Described herein are techniques and apparatus for detecting a false positive (FP) for a repetition-coded system, using a threshold parameter that is dynamically adjusted depending on channel condition and repetition factor. The proposed methods and apparatus for reducing FPs can improve performance of LTE control channel reception by minimizing the chance of entering erroneous states of DL/UL protocols by a user equipment (UE) device and/or an evolved node B (eNodeB). While the following disclosure will be presented in the context of physical control channel payload bits that erroneously pass a CRC code check, the techniques are also applicable to any payloads that have been rate matched and are susceptible to false positives due to any error checking method.

The present disclosure will now be described with reference to the attached drawing figures, wherein like reference numerals are used to refer to like elements throughout, and wherein the illustrated structures and devices are not necessarily drawn to scale. As utilized herein, terms "circuitry," "component," "system," "interface," and the like are intended to refer to a computer-related entity, hardware, software (e.g., in execution), and/or firmware. For example, a circuitry can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a circuitry. One or more circuitries can reside within a process, and a circuitry can be localized on one computer and/or distributed between two or more computers. A set of elements or a set of other circuitries can be described herein, in which the term "set" can be interpreted as "one or more."

Further, these circuitries can execute from various computer readable storage media having various data structures stored thereon such as with a module, for example. The circuitries can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a circuitry can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a circuitry can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The various exemplary systems and methods described herein may be implemented using any suitably configured hardware and/or software. FIG. 1 illustrates exemplary components of a UE device 100. The UE device 100 includes application circuitry 102, baseband circuitry 104, Radio Frequency (RF) circuitry 106, front-end module (FEM) circuitry 108 and one or more antennas 110, coupled together at least as shown.

The application circuitry 102 includes one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 includes circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuity 104 interfaces with the application circuitry 102 for generation and processing of the baseband signals and for controlling operations of the RF circuitry 106. For example, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.).

The baseband circuitry 104 (e.g., one or more of baseband processors 104a-d) handle various radio control functions that enable communication with one or more radio networks via the RF circuitry 106. The radio control functions may include, but are not limited to, signal modulation/demodulation, encoding/decoding, radio frequency shifting, etc. The modulation/demodulation circuitry of the baseband circuitry 104 may include Fast-Fourier Transform (FFT), precoding, and/or constellation mapping/demapping functionality. Encoding/decoding circuitry of the baseband circuitry 104 may include convolution, tail-biting convolution, turbo, Viterbi, and/or Low Density Parity Check (LDPC) encoder/decoder functionality. The modulation/demodulation and encoder/decoder functionality are not limited to these examples and may include other suitable functionality in other embodiments.

The baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. The baseband circuitry may include one or more audio digital signal processor(s) (DSP) 104f. The audio DSP(s) 104f may include elements for compression/decompression and echo cancellation and may include other suitable processing elements. Components of the baseband circuitry may be suitably combined in a single chip, a single chipset, or disposed on a same circuit board. Some or all of the constituent components of the baseband circuitry 104 and the application circuitry 102 may be implemented together such as, for example, on a system on a chip (SOC).

The baseband circuitry 104 may provide for communication compatible with one or more radio technologies. For example, the baseband circuitry 104 may support communication with an evolved universal terrestrial radio access network (EUTRAN) and/or other wireless metropolitan area networks (WMAN), a wireless local area network (WLAN), a wireless personal area network (W PAN).

RF circuitry 106 may enable communication with wireless networks using modulated electromagnetic radiation through a non-solid medium. The RF circuitry 106 may include switches, filters, amplifiers, etc. to facilitate the communication with the wireless network. The RF circuitry 106 includes a receive signal path which may include circuitry to down-convert RF signals received from the FEM circuitry 108 and provide baseband signals to the baseband circuitry 104. RF circuitry 106 includes a transmit signal path which may include circuitry to up-convert baseband signals provided by the baseband circuitry 104 and provide RF output signals to the FEM circuitry 108 for transmission.

The RF circuitry 106 includes a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. The mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. The output baseband signals may be zero-frequency baseband signals, although this is not a requirement. The mixer circuitry 106a of the receive signal path may comprise passive mixers, although the scope of the embodiments is not limited in this respect.

The mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

The mixer circuitry 106a of the receive signal path and the mixer circuitry 106a of the transmit signal path may include two or more mixers and may be arranged for quadrature downconversion and/or upconversion respectively. The mixer circuitry 106a of the receive signal path and the mixer circuitry 106a of the transmit signal path may include two or more mixers and may be arranged for image rejection (e.g., Hartley image rejection). The mixer circuitry 106a of the receive signal path and the mixer circuitry 106a may be arranged for direct downconversion and/or direct upconversion, respectively. The mixer circuitry 106a of the receive signal path and the mixer circuitry 106a of the transmit signal path may be configured for super-heterodyne operation.

The output baseband signals and the input baseband signals may be analog baseband signals, although the scope of the embodiments is not limited in this respect. Alternatively the output baseband signals and the input baseband signals may be digital baseband signals. In this example, the RF circuitry 106 includes analog-to-digital converter (ADC) and digital-to-analog converter (DAC) circuitry and the baseband circuitry 104 includes a digital baseband interface to communicate with the RF circuitry 106.

The synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider. The synthesizer circuitry 106d may be configured to synthesize an output frequency for use by the mixer circuitry 106a of the RF circuitry 106 based on a frequency input and a divider control input. The synthesizer circuitry 106d may be a fractional N/N+1 synthesizer. The frequency input may be provided by a voltage controlled oscillator (VCO), although that is not a requirement. Divider control input may be provided by either the baseband circuitry 104 or the applications processor 102 depending on the desired output frequency. A divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. The divider may be a dual modulus divider (DMD) and the phase accumulator may be a digital phase accumulator (DPA). The DMD may be configured to divide the input signal by either N or N+1 (e.g., based on a carry out) to provide a fractional division ratio. The DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

The synthesizer circuitry 106d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. The output frequency may be a LO frequency (fLO). The RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

The FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

The UE device 100 may include additional elements such as, for example, memory/storage, display, camera, sensor, and/or input/output (I/O) interface.

FIG. 2 illustrates a portion of an exemplary eNodeB transmit baseband circuitry 204 that includes selected baseband components related to encoding of physical control channel related payloads (or other information payloads) for transmission to a UE device. FIG. 3 also illustrates a corresponding portion of an exemplary UE receive baseband circuitry that includes selected baseband components related to decoding of physical control channel related payloads.

As shown in FIG. 2, an eNodeB may start with the PDCCH payload data of a number A bits generated by payload circuitry 212 as detailed in Section 5.3.3 of 3GPP TS 36.212 "Evolved Universal Terrestrial Radio Access (E-UTRA); Multiplexing and channel coding" V13.1.0 (Release 13). The number A may vary depending on the DCI format, e.g. low complexity DCI formats such as single-antenna transmission have less payload data than complex DCI formats such as MIMO transmission, and on system bandwidth (with larger system bandwidth settings needing larger payload size). CRC circuitry 213 appends a 16-bit CRC to the payload data to obtain a B=A+16 bit un-encoded sequence. The CRC circuitry 213 may derive the CRC based on the radio network temporary identifier (RNTI) of the destination mobile terminal.

Encoder circuitry 214 then encodes the B bit un-encoded sequence. The encoder circuitry is a 1/3 rate convolutional encoder as specified by the 3GPP. Accordingly, given the 1/3 rate encoder circuitry 214 produces 3B bits in the form of three separate bitstreams each of length B, where each bitstream corresponds to a respective encoded bit position. Due to the bit capacity constraints placed by an aggregation level L (which specifies the number of control channel elements (CCEs) to be used for the message), the rate match circuitry 215 performs rate matching to obtain an E=72L bit sequence (assuming each CCE contains 72 bits) from the 3B bits of the encoded bit sequence.

The false positive detection techniques described herein allow the UE to exploit the rate-matching procedure employed by eNodeB in generating the E bit encoded sequence to detect false positives. In order to ensure that the encoded sequence can be completely decoded by a destination mobile terminal, the rate match circuitry 215 ensures that each of the original B bits (of which A are payload data and 16 are CRC bits) is represented by at least one bit of the E-bit encoded sequence; otherwise, the mobile terminal may not have enough information to decode all of the bits. Accordingly, E must be at least B, i.e. E≥B, meaning that the eNodeB may select an aggregation level L sufficient to fit at least B bits into the E=72L bits of the rate-matched sequence E. Most DCI formats will be able to fit into a single CCE, i.e. B≤72; however, some DCI formats may be larger and thus may require a minimum aggregation level of L=2.

Depending on the aggregation level L and original sequence length B, the rate match circuitry 215 may either employ puncturing or bit replication in order to produce an E length sequence. For example, if not all of the 3B bits encoded bits will fit into the E total bits of the L aggregated CCEs, rate match circuitry 215 may discard, or 'puncture' some of the encoded bits to arrive at E bits that will fit into the L aggregated CCEs; conversely, if more than the 3B bits will fit into the E total bits of the L aggregated CCEs, rate match circuitry 215 may duplicate or repeat some of the encoded bits to produce E bits to place into the L aggregated CCEs.

As specified by the 3GPP, encoder circuitry 214 generates the B bit sequence by generating the aforementioned three bitstreams each of length 3: $b_0(k)$, $b_1(k)$, and $b_2(k)$ for k=0, 1, . . . , B-1. The encoding circuitry 214 then generates the 3B bit encoded sequence $b_{enc}(k)$, k=0, 1, . . . , 3B-1 by placing $b_0(0)$ . . . $b_0(B-1)$ as the first B bits of $b_{enc}(k)$, $b_1(0)$ . . . $b_1(B-1)$ as next B bits of $b_{enc}(k)$, and $b_2(0)$ . . . $b_2(B-1)$ for the remaining B bits of $b_{enc}(k)$, i.e.

$$b_{enc}(k)=[b_0(0) \ldots b_0(B-1)b_1(0) \ldots b_1(B-1)b_2(0) \ldots b_2(B-1)] \qquad (1)$$

As previously noted, there is at least one encoded bit of $b_{enc}(k)$ that corresponds to each unencoded bit of the original B bit sequence in order to allow a UE device to fully recover the original sequence, i.e. one coding bit corresponding to each of the original B bits. The presence of multiple coding bits, e.g. if two or more of $b_0(0)$, $b_1(0)$, and $b_2(0)$ are present for bit position k=0 of the original sequence, may offer coding gains for bit k=0 during decoding by a mobile terminal; additionally, the presence of duplicated bits, e.g. if $b_0(0)$ is duplicated in the encoded sequence, such may offer energy or "combining" gains during decoding as the UE device combines the received replicated bits. While only the first B bits of $b_{enc}(k)$ are theoretically needed to decode, multiple coding bits and duplicated bits are useful for UE devices in poor radio conditions to reliably decode the encoded sequence.

Rate match circuitry 214 may need to puncture or replicate the encoded bit sequence $b_{enc}(k)$ to arrive at a rate matched sequence $b_{rm}(k)$, k=0, 1, . . . , E-1 (where some puncturing may be required in every case that E is not an integer multiple of 3B). Accordingly, if 3B>E, i.e. not all of the 3B bits of $b_{enc}(k)$ will fit into the E total bits of the L aggregated CCEs, the rate matching circuit 214 may simply perform burst puncturing and drop the 3B-E last bits of $b_{enc}(k)$, thus producing the rate-matched sequence $b_{rm}(k)$ as the first E bits of $b_{enc}(k)$, i.e.

$$b_{rm}(k)=b_{enc}(k),k=0,1, \ldots ,E-1 \qquad (2)$$

The rate match circuitry 215 then passes the resulting E bit rate-matched sequence $b_{rm}(k)$ to modulator circuitry 216 for modulation and transmission. Accordingly, $b_{rm}(k)$ may contain multiple encoded bits corresponding to certain bit positions of the un-encoded sequence (assuming E≠3B) and may thus offer a coding gain for certain bit positions; however, as less than the 3B bits were transmitted there may only be coding gains at some bit positions and no combining gain in any bit positions (because no encoded bits were replicated).

The condition 3B>E may be feasible if the destination UE device is operating in an environment with in strong radio conditions. However, it may be difficult for a UE device to reliably decode the rate-matched sequence $b_{rm}(k)$ with only partial coding gains and no combining gains in the face of noise and interference. Accordingly, for UE devices experiencing poor radio conditions, the eNodeB may select a larger aggregation level L which may as a result allow for more of the 3B encoded bits of $b_{enc}(k)$ to be passed by the rate match circuitry 215 to $b_{rm}(k)$. For example, if E≥3B, i.e. if at least the 3B bits of $b_{enc}(k)$ will fit in the L total aggregated CCEs, the rate match circuitry 215 is be able to pass the complete 3B bits of $b_{enc}(k)$ to $b_{rm}(k)$, thus offering coding gains for every bit.

Furthermore, if E>3B, i.e. if more than the 3B bits of $b_{enc}(k)$ will fit into the L aggregated CCEs, the rate match circuitry 215 may additionally be able to duplicate some of the 3B bits to fill the remaining E-3B bit positions of the L aggregated CCEs, thus offering a combining gain at the duplicated bit positions as a decoder may be able to combine multiple bits together. If $b_{rm}(k)$ is e.g. double or triple the size of $b_{enc}(k)$, i.e. if $b_{enc}(k)$ fits multiple times within $b_{rm}(k)$, the rate matching circuitry 215 is able to duplicate $b_{enc}(k)$ several times over, thus offering substantial combining gain.

Turning now to the operation of the UE receive baseband circuitry 304, demodulator circuitry 322 demodulates a received signal to generate an E bit "demodulated set of bits" which, if no errors were present, are soft bits having values that match the E bit encoded sequence generated by the rate match circuitry 215. The demodulator circuitry 322 performs a modulation de-mapping in order to convert received IQ modulation symbols into soft bits (such as e.g. a Log Likelihood Ratio (LLR)) according to the particular modulation scheme. The resulting demodulated soft bits may range over a positive and negative range, such as e.g. −127 to 127 for an 8-bit soft bit scheme, where the sign of the soft bit indicates a logical "0" or "1" and the magnitude of the soft bit indicates the strength of the sign. Accordingly, soft bits with high magnitudes may indicate a high confidence in the bit signs while soft bits with low magnitudes may indicate low confidence in the bit signs.

De-rate match circuitry 323 performs de-rate matching on the E "soft bits" output by the demodulator circuitry 322 to generate a "de-rate-matched" set of bits having a number D or 3B soft bits. During de-rate matching the set of repeated soft bits corresponding to each soft bit in the 3B bit sequence are analyzed to determine a soft value for the bit. Recall that repetition of bits during rate matching results in a combining gain that is realized by the de-rate match circuitry 323. In general, a bit value that is decided based on repeated bits will result in a higher confidence (i.e., higher magnitude) than a bit value that was decided without the benefit of repetition. Thus, the average magnitude of the de-modulated set of E bits output by the demodulator circuitry 322 should be lower than the average magnitude of the de-rate-matched set of D or 3B bits generated by the de-rate matched circuitry 323. However, if the received signal is very noisy or does not in fact encode any information, there should not be any significant combining gain as the repetition operation performed by rate match circuitry 215 was not performed and the set of bits corresponding to each bit in the 3B bit sequence should have a random distribution.

The de-rate-matched set of bits is input to decoder circuitry 324 which decodes the 3B bits into B bits using the FEC scheme that was used by encoding circuitry 214 to encode the B bits. CRC check circuitry 325 identifies the CRC code in the B bits and performs a CRC check on the CRC code. If the CRC code passes the check, the CRC code bits are removed and the A remaining bits, which ideally match the A encoded payload bits generated by payload circuitry 212 are passed to control circuitry 326. The control circuitry 326 uses the information in the A payload bits to control one or more aspects of communication performed by the UE device as described above.

The UE receive baseband circuitry 304 includes false positive (FP) detector circuitry 330 that exploits the observation that a combining gain should be realized by the de-rate-matching performed by the de-rate match circuitry 323. In general, the UE device can expect combining gain of soft bits after de-rate matching that increases proportionally to the signal-to-noise ratio (SNR) and the repetition factor. The FP detector circuitry determines the "combining gain" of the de-rate-matching operation. The combining gain is compared to a threshold and if the combining gain does not exceed the threshold, a false positive is detected. The FP detector circuitry 330 generates a signal indicating that a false positive has been detected and provides the false positive signal to the control circuitry 326 or any other appropriate circuitry so that the payload bits A associated with the sequence of bits that generated the false positive are not used by the UE device to control operation of the UE device. In one example, the FP detector circuitry 330 does not detect a false positive unless the CRC code check performed by CRC check circuitry 325 was successful. In response to the false positive signal, the control circuitry 326 may control the decoder circuitry 324 and/or CRC check circuitry 325 to refrain from processing sets of bits that caused the FP detector circuitry to generate the false positive signal.

FIG. 3 illustrates a block diagram of an exemplary FP detector circuitry 330. The FP detector circuitry 330 includes threshold circuitry 340, gain circuitry 350, decision circuitry 360, and threshold circuitry 340. The gain circuitry 350 is configured to calculate a combining gain experienced during processing of the set of bits by the UE receive baseband circuitry. The decision circuitry 360 is configured to compare the combining gain to a threshold. The threshold is selected by the threshold circuitry 340. The decision circuitry 360 generates a false positive signal that indicates that the set of bits has been incorrectly decoded when the combining gain is less than the threshold. In one example, the FP detector circuitry 330 detects a false positive when a CRC check result indicates that a set of bits was successfully decoded.

In one example, the gain circuitry 350 is configured to calculate the combining gain based on a ratio between an average magnitude of the set of soft bits E before the de-rate matching operation and an average magnitude of the set of soft bits D or 3B after the de-rate matching operation (denoted as m and $\tilde{m}$ respectively). Recall that the average magnitude of the de-rate-matched set of bits should be higher than the average magnitude of the demodulated set of bits due to the combining gain or increased level of confidence due to the repetition of bits. The received and demodulated soft bits ($y_i$) can be modeled as:

$$y_i = s_i + n_i, i = 1, \ldots, E \quad \text{EQ 1}$$

where $s_i$ is the transmitted signal, $n_i$ is the noise component, and E is the number of soft bits after rate matching. Next, the average magnitude of pre-/post-DRM soft bits can be modeled as:

$$m = \frac{\sum_{i=1}^{E} |y_i|}{E} \quad \text{EQ 2}$$

$$\tilde{m} = \frac{\sum_{j \in \{R_1\}} \left| \sum_{i=1}^{R_1} y_{j,i} \right| + \sum_{k \in \{R_2\}} \left| \sum_{i=1}^{R_2} y_{k,i} \right|}{D} \quad \text{EQ 3}$$

where $\{R_i\}$: is a set of indices of received soft bits that were repeated $R_i$ times during rate matching and D is the number of soft bits after de-rate matching. Finally the ratio of average magnitude before and after DRM can be calculated as:

$$r = \frac{\tilde{m}}{m} \qquad \text{EQ 4}$$

The decision circuitry 360 compares the ratio to a predefined combining gain threshold value ($r_{th}$), and when the combining gain is below the threshold, the decision circuitry 360 selects a false positive. When the combining gain is above the threshold, the decision circuitry 360 signals that a true grant has occurred.

The threshold circuitry 340 is configured to determine the threshold for combining gain ($r_{th}$) that is based on one or more characteristics of a received signal that encoded the set of bits. In one example, the threshold circuitry 340 is configured to determine the threshold based at least on a signal to noise (SNR) ratio of a channel on which the received signal was received and a repetition rate for the set of bits. The SNR may be determined by the demodulator circuitry 322 and the repetition rate may be calculated by the threshold circuitry 340 per the 3GPP specification. The false positive detection circuitry 330 includes memory (or is able to access memory) that stores a lookup table (LUT) that maps respective thresholds to respective combinations of signal to noise ratio and repetition rate. The threshold circuitry 340 is configured to read the lookup table to determine the threshold.

In order to determine the threshold for a given SNR and repetition rate, simulations may be run based on the aforementioned system model, first in a pure-noise scenario (i.e., $s_i=0$), and secondly with a transmitted signal. For the latter, it is assumed that $s_i=1$ without loss of generality. The measured ratio for noise-only and signal-present scenarios are denoted by $r_n$ and $r_s$ respectively. Random variables $R_n$ and $R_s$ are defined for $r_n$ and $r_s$ respectively. The goal is finding probability density function (PDF) for each random variable, denoted by $f_n(r)$ and $f_s(r)$, and selecting an optimal threshold value ($r_{th}$) that minimizes FP rate in noise-only scenario and missed-detection rate for signal-present scenario.

Figure 4A:
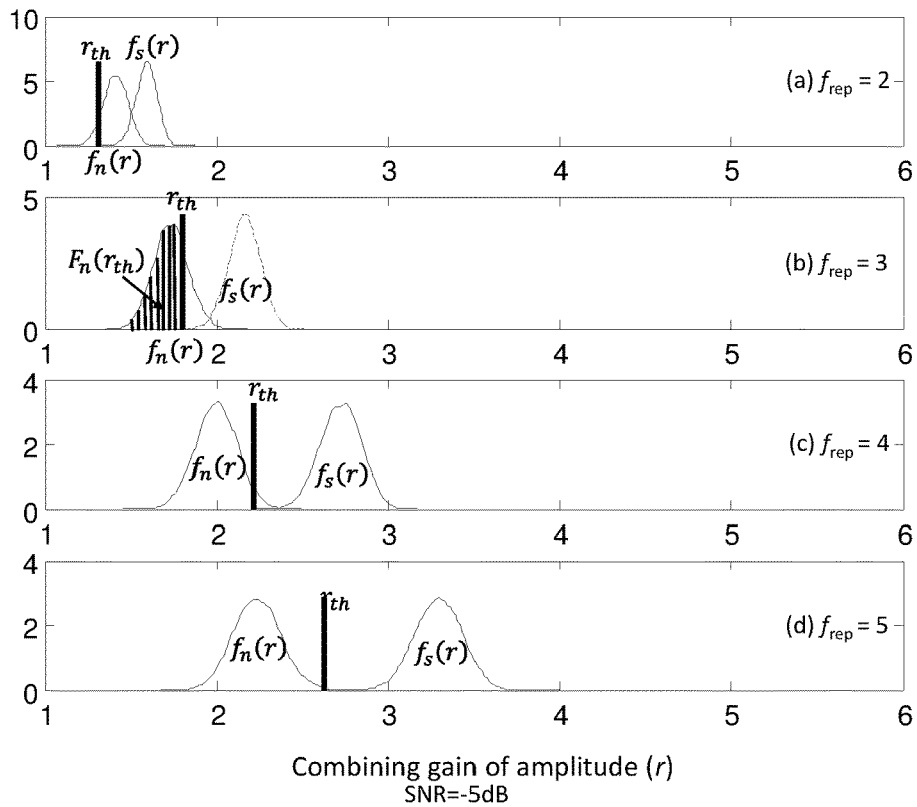
FIGS. 4A-4C illustrate probability density functions of a noise signal and a received signal in relationship to an exemplary combining gain threshold.
Figure 4B:
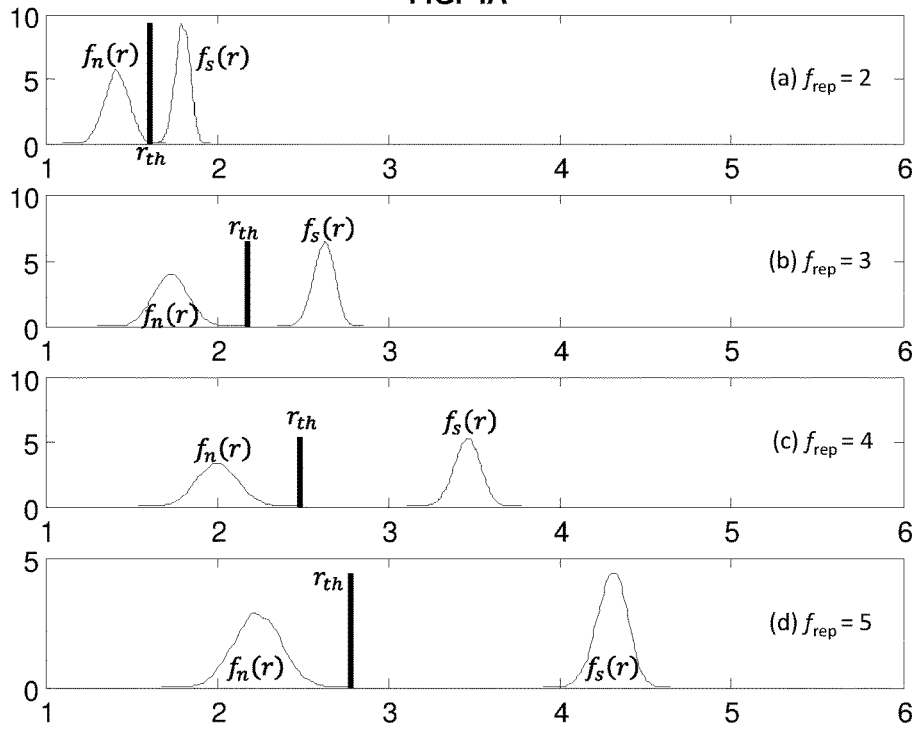
Figure 4C:
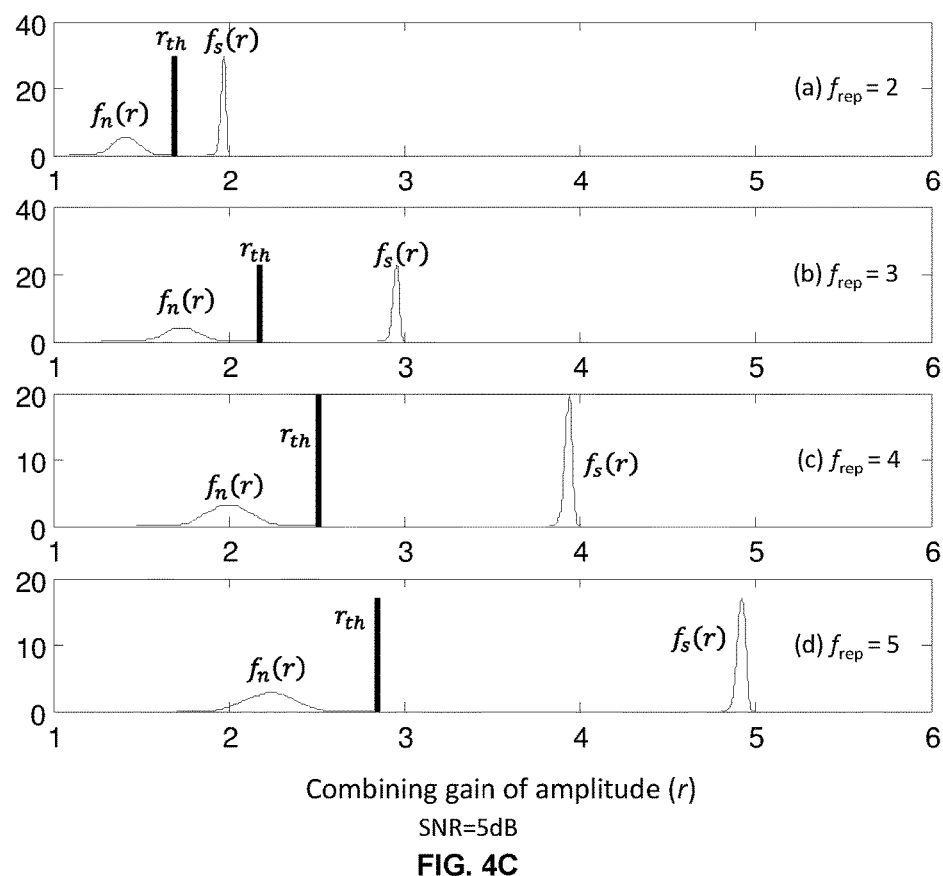

FIGS. 4A-4C illustrate the obtained PDF's for some representative SNR and $f_{rep}$ values, and also selected threshold values for each scenario. Note that the mean value of $f_s(r)$ approaches $f_{rep}$ as SNR increases. When selecting $r_{th}$ in case of overlapping PDF's, priority is given to minimizing missed-grant rate over minimizing FP rate. In one example, a CRC-passing grant is considered as a FP, when the following condition is satisfied:

$$r \leq r_{th} \qquad \text{EQ 5}$$

The reduction factor of FP rate can be calculated as:

$$Pr\{R_n > r^{th}\} = 1 - \int_{-\infty}^{r_{th}} f_n(r)dr = 1 - F_n(r_{th}) \qquad \text{EQ 6}$$

where $F_n(r)$ is a cumulative density function (CDF) for noise-only scenario. Similarly, the missed-detection rate can be calculated as:

$$Pr\{R_s \leq r_{th}\} = \int_{-\infty}^{r_{th}} f_s(r)dr = F_s(r_{th}) \qquad \text{EQ 7}$$

The threshold lookup table stores threshold values for the combining gain based on quantized values of SNR and $f_{rep}$. It is noted that $r_{th}$ should be chosen such that reasonable trade-off between improving false positive performance and minimizing impact on the missed detection performance.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Figure 5:
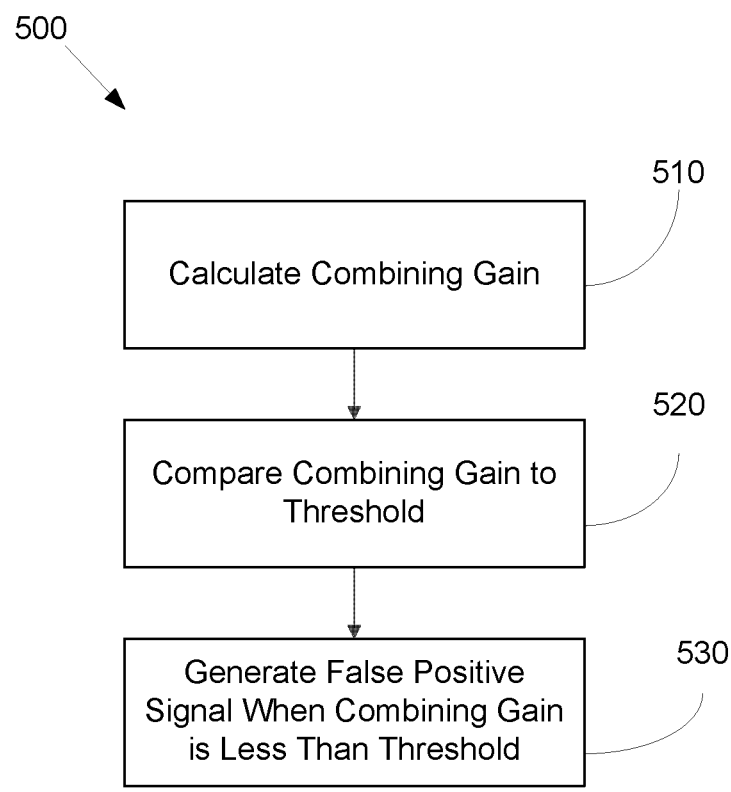
FIG. 5 illustrates a flowchart that outlines an exemplary method for detecting a false positive in decoding of a set of bits.

FIG. 5 depicts a flowchart outlining one exemplary method 500 for detecting that a set of bits has been incorrectly decoded. The method 500 may be performed by FP detector circuitry 330 of FIGS. 2 and/or 3. The method 500 includes, at 510, calculating a combining gain experienced during processing of the set of bits. At 520 the combining gain is compared to a threshold and, at 530, a false positive signal that indicates that the set of bits has been incorrectly decoded is generated when the combining gain is less than the threshold.

It can be seen from the foregoing description that the disclosed false positive detection techniques can filter out some FPs that would not be detected by typical method of payload content validation. The disclosed FP detection techniques can minimize FP rate and missed-detection rate, based on SNR and repetition factor, which can be 4 per TTI (or 16 per 4 TTI's) for PBCH, and 24 for PHICH, and up to 6.9 for PDCCH. The disclosed FP detection techniques do not require defining and generating a metric within FEC decoder and a softer threshold metric that is obtained from averaged soft values is used, making the techniques less susceptible to uncertainty compared to using hard threshold metric. The disclosed techniques also work effectively in a low SNR regime.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is false positive detection circuitry configured to detect a set of bits that has been incorrectly decoded, including gain circuitry and decision circuitry. The gain circuitry is configured to calculate a combining gain experienced during processing of the set of bits. The decision circuitry is configured to compare the combining gain to a threshold and generate a false positive signal that indicates that the set of bits has been incorrectly decoded when the combining gain is less than the threshold.

Example 2 includes the subject matter of example 1, including or omitting optional elements, wherein the gain circuitry is configured to calculate the combining gain based on a ratio between an average magnitude of the set of bits before a de-rate matching operation and an average magnitude of the set of bits after the de-rate matching operation.

Example 3 includes the subject matter of example 2, including or omitting optional elements, wherein the gain circuitry is configured to calculate the combining gain by: summing and averaging the set of bits before the de-rate matching operation to compute a first metric; summing and averaging the set of bits after the de-rate matching operation to compute a second metric; and calculating the combining gain as a ratio of the first metric to the second metric.

Example 4 includes the subject matter of examples 1-3, including or omitting optional elements, further including a threshold circuitry configured to determine the threshold for combining gain based on one or more characteristics of a received signal that encoded the set of bits.

Example 5 includes the subject matter of example 4, including or omitting optional elements, wherein the threshold circuitry is configured to determine the threshold based at least on a signal to noise ratio of a channel on which the received signal was received and a repetition rate for the set of bits.

Example 6 includes the subject matter of example 5, including or omitting optional elements, further including memory configured to store a lookup table that maps respective thresholds to respective combinations of signal to noise ratio and repetition rate, further wherein the threshold circuitry is configured to read the lookup table to determine the threshold.

Example 7 includes the subject matter of examples 1-3, including or omitting optional elements, wherein the decision circuitry is configured to: determine whether the set of bits has passed a cyclic redundancy code check; and generate the false positive signal when the set of bits has passed the cyclic redundancy code check.

Example 8 is a method for detecting that a set of bits has been incorrectly decoded, including determining a threshold for the combining gain based on one or more characteristics of a received signal that encoded the set of bits and generating the false positive signal when the combining gain is less than the threshold.

Example 9 includes the subject matter of example 8, including or omitting optional elements, further including calculating the combining gain based on a ratio between an average magnitude of the set of bits before a de-rate matching operation and an average magnitude of the set of bits after the de-rate matching operation.

Example 10 includes the subject matter of example 9, including or omitting optional elements, wherein calculating the combining gain includes: summing and averaging the set of bits before the de-rate matching operation to compute a first metric; summing and averaging the set of bits after the de-rate matching operation to compute a second metric; and calculating the combining gain as a ratio of the first metric to the second metric.

Example 11 includes the subject matter of examples 8-10, including or omitting optional elements, further including determining a threshold for the combining gain based on one or more characteristics of a received signal that encoded the set of bits and generating the false positive signal when the combining gain is less than the threshold.

Example 12 includes the subject matter of example 11, including or omitting optional elements, wherein determining the threshold is based at least on a signal to noise ratio of a channel on which the received signal was received and a repetition rate for the set of bits.

Example 13 includes the subject matter of example 12, including or omitting optional elements, wherein determining the threshold includes reading a lookup table that maps respective thresholds to respective combinations of signal to noise ratio and repetition rate.

Example 14 includes the subject matter of examples 8-10, including or omitting optional elements, further including: determining whether the set of bits has passed a cyclic redundancy code check; and generating the false positive signal when the set of bits has passed the cyclic redundancy code check.

Example 15 is a device, including: a demodulator circuitry configured to demodulate a received signal to generate a demodulated set of bits; a de-rate match circuitry configured to generate a de-rate-matched set of bits by analyzing redundant bits in the set of bits; and a false positive detector circuitry configured to detect that the set of bits has been incorrectly decoded based at least on the demodulated set of bits and the de-rate matched set of bits.

Example 16 includes the subject matter of example 15, including or omitting optional elements, wherein the false positive detection circuitry includes gain circuitry and decision circuitry. The gain circuitry is configured to calculate a combining gain based on a ratio between an average magnitude of the demodulated set of bits and an average magnitude of the de-rate-matched set of bits. The decision circuitry is configured to compare the combining gain to a threshold and generate a false positive signal that indicates that the set of bits has been incorrectly decoded when the combining gain is less than the threshold.

Example 17 includes the subject matter of example 16, including or omitting optional elements, wherein the gain circuitry is configured to calculate the combining gain by: summing and averaging the demodulated set of bits operation to compute a first metric; summing and averaging the de-rate-matched set of bits to compute a second metric; and calculating the combining gain as a ratio of the first metric to the second metric.

Example 18 includes the subject matter of examples 16-17, including or omitting optional elements, wherein the false positive detector circuitry includes threshold circuitry configured to determine the threshold for combining gain based on one or more characteristics of the received signal.

Example 19 includes the subject matter of example 18, including or omitting optional elements, wherein the threshold circuitry is configured to determine the threshold based at least on a signal to noise ratio of a channel on which the received signal was received and a repetition rate for the set of bits.

Example 20 includes the subject matter of example 15, including or omitting optional elements, further including memory configured to store a lookup table that maps respective thresholds to respective combinations of signal to noise ratio and repetition rate, further wherein the threshold circuitry is configured to read the lookup table to determine the threshold.

Example 21 includes the subject matter of example 15, including or omitting optional elements, further including: decoder circuitry configured to decode the de-rate-matched set of bits to generate a decoded set of bits; cyclic redundancy code check circuitry configured to determine whether the decoded set of bits meets criteria embodied in a cyclic redundancy code; and wherein the false positive detector circuitry is configured to generate the false positive signal only when the decoded set of bits meet the criteria.

Example 22 includes the subject matter of example 15, including or omitting optional elements, further including: decoder circuitry configured to decode the de-rate-matched set of bits to generate a decoded set of bits; cyclic redundancy code check circuitry configured to determine whether the decoded set of bits meets criteria embodied in a cyclic redundancy code, and wherein the decoder circuitry is configured to refrain from decoding the de-rate-matched set of bits in response to the false positive signal.

Example 23 includes the subject matter of example 15, including or omitting optional elements, further including: decoder circuitry configured to decode the de-rate-matched set of bits to generate a decoded set of bits; cyclic redundancy code check circuitry configured to determine whether the decoded set of bits meets criteria embodied in a cyclic redundancy code, and wherein the cyclic redundancy code check circuitry is configured to refrain from determining whether the decoded set of bits meets the criteria in response to the false positive signal.

Example 24 is an apparatus for detecting that a set of bits has been incorrectly decoded. The apparatus includes: means for calculating a combining gain experienced during processing of the set of bits; comparing the combining gain to a threshold; and means for generating a false positive signal that indicates that the set of bits has been incorrectly decoded when the combining gain is less than the threshold.

Example 25 includes the subject matter of example 24, including or omitting optional elements, further including means for calculating the combining gain based on a ratio between an average magnitude of the set of bits before a de-rate matching operation and an average magnitude of the set of bits after the de-rate matching operation.

Example 26 includes the subject matter of example 24, including or omitting optional elements, including means for reading a lookup table that maps respective thresholds to respective combinations of signal to noise ratio and repetition rate.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. False positive detection circuitry configured to detect a set of bits that has been incorrectly decoded by a user device, comprising:
a gain circuitry configured to calculate a combining gain experienced during a processing operation performed on the set of bits, wherein the combining gain corresponds to an increase in magnitude of bits in the set of bits that results from the processing operation; and
a decision circuitry configured to:
compare the combining gain to a threshold;
generate a false positive signal, which indicates that the set of bits has been incorrectly decoded when the combining gain is less than the threshold; and
wherein in response to the false positive signal, the user device refrains from operating based on the set of bits.

2. The false positive detection circuitry of claim 1, wherein the gain circuitry is configured to calculate the combining gain based on a ratio between an average magnitude of the set of bits before a de-rate matching operation and an average magnitude of the set of bits after the de-rate matching operation.

3. The false positive detection circuitry of claim 2, wherein the gain circuitry is configured to calculate the combining gain by:
summing and averaging the set of bits before the de-rate matching operation to compute a first metric;
summing and averaging the set of bits after the de-rate matching operation to compute a second metric; and
calculating the combining gain as a ratio of the first metric to the second metric.

4. The false positive detection circuitry of claim 1, further comprising a threshold circuitry configured to determine the threshold for combining gain based on one or more characteristics of a received signal that encoded the set of bits.

5. The false positive detection circuitry of claim 4, wherein the threshold circuitry is configured to determine the threshold based at least on a signal to noise ratio of a channel on which the received signal was received and a repetition rate for the set of bits.

6. The false positive detection circuitry of claim 5, further comprising memory configured to store a lookup table that maps respective thresholds to respective combinations of signal to noise ratio and repetition rate, further wherein the threshold circuitry is configured to read the lookup table to determine the threshold.

7. The false positive detection circuitry of claim 1, wherein the decision circuitry is configured to:
determine whether the set of bits has passed a cyclic redundancy code check; and
generate the false positive signal when the set of bits has passed the cyclic redundancy code check.

8. A method for detecting that a set of bits has been incorrectly decoded, comprising:
calculating a combining gain experienced during a processing operation on the set of bits, wherein the combining gain corresponds to an increase in magnitude of bits in the set of bits that results from the processing operation; and
generating a false positive signal that indicates that the set of bits has been incorrectly decoded based at least on the combining gain; and
in response to the false positive signal, refraining from operating a device based on the set of bits.

9. The method of claim 8, further comprising calculating the combining gain based on a ratio between an average magnitude of the set of bits before a de-rate matching operation and an average magnitude of the set of bits after the de-rate matching operation.

10. The method of claim 9, wherein calculating the combining gain comprises:
summing and averaging the set of bits before the de-rate matching operation to compute a first metric;
summing and averaging the set of bits after the de-rate matching operation to compute a second metric; and
calculating the combining gain as a ratio of the first metric to the second metric.

11. The method of claim 8, further comprising determining a threshold for the combining gain based on one or more characteristics of a received signal that encoded the set of bits and generating the false positive signal when the combining gain is less than the threshold.

12. The method of claim 11, wherein determining the threshold is based at least on a signal to noise ratio of a channel on which the received signal was received and a repetition rate for the set of bits.

13. The method of claim 12, wherein determining the threshold comprises reading a lookup table that maps respective thresholds to respective combinations of signal to noise ratio and repetition rate.

14. The method of claim 8, further comprising:
determining whether the set of bits has passed a cyclic redundancy code check; and
generating the false positive signal when the set of bits has passed the cyclic redundancy code check.

15. A device, comprising:
a demodulator circuity configured to demodulate a received signal to generate a demodulated set of bits;
a de-rate match circuitry configured to generate a de-rate-matched set of bits by analyzing redundant bits in the set of bits; and
a false positive detector circuitry configured to detect that the set of bits has been incorrectly decoded based at least on a magnitude of bits in the demodulated set of bits as compared to a magnitude of bits in the de-rate matched set of bits; and
wherein in response to the false positive signal, the device refrains from operating based on the set of bits.

16. The device of claim 15, wherein the false positive detection circuitry comprises:
a gain circuitry configured to calculate a combining gain based on a ratio between an average magnitude of the demodulated set of bits and an average magnitude of the de-rate-matched set of bits; and
a decision circuitry configured to:
compare the combining gain to a threshold; and
generate a false positive signal that indicates that the set of bits has been incorrectly decoded when the combining gain is less than the threshold.

17. The device of claim 16, wherein the gain circuitry is configured to calculate the combining gain by:
summing and averaging the demodulated set of bits to compute a first metric;
summing and averaging the de-rate-matched set of bits to compute a second metric; and
calculating the combining gain as a ratio of the first metric to the second metric.

18. The device of claim 16, wherein the false positive detector circuitry comprises threshold circuitry configured to determine the threshold for combining gain based on one or more characteristics of the received signal.

19. The device of claim 18, wherein the threshold circuitry is configured to determine the threshold based at least on a signal to noise ratio of a channel on which the received signal was received and a repetition rate for the set of bits.

20. The device of claim 15, further comprising memory configured to store a lookup table that maps respective thresholds to respective combinations of signal to noise ratio and repetition rate, further wherein the threshold circuitry is configured to read the lookup table to determine the threshold.

21. The device of claim 15, further comprising:
decoder circuitry configured to decode the de-rate-matched set of bits to generate a decoded set of bits;
cyclic redundancy code check circuitry configured to determine whether the decoded set of bits meets criteria embodied in a cyclic redundancy code; and
wherein the false positive detector circuitry is configured to generate the false positive signal only when the decoded set of bits meet the criteria.

22. The device of claim 15, further comprising:
decoder circuitry configured to decode the de-rate-matched set of bits to generate a decoded set of bits;
cyclic redundancy code check circuitry configured to determine whether the decoded set of bits meets criteria embodied in a cyclic redundancy code; and
wherein the decoder circuitry is configured to refrain from decoding the de-rate-matched set of bits in response to the false positive signal.

23. The device of claim 15, further comprising:
decoder circuitry configured to decode the de-rate-matched set of bits to generate a decoded set of bits;
cyclic redundancy code check circuitry configured to determine whether the decoded set of bits meets criteria embodied in a cyclic redundancy code; and
wherein the cyclic redundancy code check circuitry is configured to refrain from determining whether the decoded set of bits meets the criteria in response to the false positive signal.

* * * * *